(12) United States Patent
Maruoka

(10) Patent No.: US 8,186,405 B2
(45) Date of Patent: May 29, 2012

(54) HEAVY-LOAD RADIAL TIRE

(76) Inventor: Kiyoto Maruoka, Kobe (JP)

(*) Notice: Subject to any disclaimer, the term of this patent is extended or adjusted under 35 U.S.C. 154(b) by 343 days.

(21) Appl. No.: 12/714,132

(22) Filed: Feb. 26, 2010

(65) Prior Publication Data

US 2010/0224300 A1 Sep. 9, 2010

(30) Foreign Application Priority Data

Mar. 6, 2009 (JP) .................................. 2009-053885
Jan. 27, 2010 (JP) .................................. 2010-015877

(51) Int. Cl.
B60C 15/00 (2006.01)
B60C 15/06 (2006.01)

(52) U.S. Cl. ........ 152/539; 152/541; 152/542; 152/546; 152/552

(58) Field of Classification Search .................. 152/539, 152/540, 541, 542, 543, 544, 545, 546, 547, 152/552, 555

See application file for complete search history.

(56) References Cited

U.S. PATENT DOCUMENTS

2008/0035261 A1  2/2008  Maruoka

FOREIGN PATENT DOCUMENTS

| JP | 2-133208    | * | 5/1990 |
| JP | 2002-205508 A |   | 7/2002 |
| JP | 2008-037314 A |   | 2/2008 |

* cited by examiner

Primary Examiner — Justin Fischer
(74) Attorney, Agent, or Firm — Birch, Stewart, Kolasch & Birch, LLP

(57) ABSTRACT

A heavy-load radial tire includes a bead apex rubber 8 composed of a high-elastic lower apex portion 11 and a low-elastic upper apex portion 12. The lower apex portion 11 has an L-shaped cross section composed of a bottom piece portion 11a disposed along the radially outer surface of a bead core 5 and a standing piece portion 11b standing from the axially inner end of the bottom piece portion 11a and radially outwardly extending along a ply main portion 6a of a carcass 6. At an outer end position P1 of a ply turnup portion 6b, the upper apex portion 12 has a thickness T1s of 0.50 to 0.75 times a core width Bw of the bead core 5. At an outer end position P2 of an outer wound-up portion 9o of a bead reinforcing cord layer 9, the upper apex portion 12 has a thickness T2s of 0.57 to 0.90 times the core width Bw. The core width Bw is 0.68 to 0.80 times a bead bottom width BL. A distance W1 oriented in parallel to an outer surface 5S of the bead core 5 and ranging from a bead heal point Ph to an axially innermost end 5e of the bead core 5 is 0.92 to 1.08 times the bead bottom width BL.

4 Claims, 4 Drawing Sheets

HEAVY-LOAD RADIAL TIRE

BACKGROUND OF THE INVENTION

1. Technical Field

The present invention relates to a heavy-load radial tire possessing improved bead durability.

2. Related Art

Pneumatic tires, when heavily loaded, have the ply main portions of their carcasses fall toward the rim. This involves substantial movement of the bead apex rubber, which in turn causes shearing strain between the bead apex rubber and the ply turnup portion. Repeated occurrence of shearing strain causes cord loosening at the outermost end of the ply main portion, resulting in bead damage. Bead damage is likely to occur especially on heavy-load radial tires, such as for trucks and buses, which involve heavy load.

In view of this, conventional heavy-load radial tires commonly use a two-layer structure as shown in FIG. 4A, where a bead apex rubber b disposed between a ply main portion a1 and a ply turnup portion a2 of the carcass is divided into a lower apex portion b1 of high-elastic rubber disposed on a radially inner side and an upper apex portion b2 of low-elastic rubber disposed on a radially outer side (i.e., see Japanese Patent Application Publication No. 2002-205508). With this structure, the high-elastic lower apex portion b1 reduces bead deformation and the low-elastic upper apex portion b2 alleviates stress to the carcass cord caused by shearing strain, thereby inhibiting cord loosening.

However, there is a need for further improvement in bead durability considering reuse as retreaded tires.

In view of this, Japanese Patent Application Publication No. 2008-037314 proposes, as shown in FIG. 4B, forming the high-elastic lower apex portion b1 of the bead apex rubber b into an L-shaped cross section composed of a bottom piece portion b1$a$ and a standing piece portion b1$b$, the bottom piece portion b1$a$ being disposed along a radially outer surface of a bead core c, the standing piece portion b1$b$ standing from an axially inner end of the bottom piece portion b1$a$. This structure reduces the rubber volume of the lower apex portion b1 while increasing the rubber volume of the low-elastic upper apex portion b2. This provides for the advantage of enhancing alleviation effect for shearing strain especially acting on the outermost portion of the ply turnup portion a2. However, the L-shaped cross section of the lower apex portion b1 reduces rigidity, which increases the deformation quantity of the profile of the ply main portion while the vehicle is running.

SUMMARY OF THE INVENTION

In view of the above circumstances, the present inventors conducted an extensive study on tires having the lower apex portions b1 shaped in L cross section. This revealed that reduction in deformation quantity of the profile of the ply main portion, the enhancement of the inhibition effect for cord loosening, and improvement in bead durability are possible by relatively moving the bead core c toward the axially inner side to increase the distance between a bead heel point Ph and an axially innermost end of the bead core c while securing a sufficient core width Bw of the bead core c.

It is an object of the present invention to provide a heavy-load radial tire capable of reducing deformation quantity of the profile of the ply main portion, and of effectively inhibiting cord loosening at the ply turnup portion and thus improving bead durability by the combined effect of the deformation quantity reduction and the alleviation effect for shearing strain realized by the L cross section of the lower apex portion.

According to a first aspect of the present invention, a heavy-load radial tire comprises:

a carcass comprising a carcass ply, the carcass ply comprising: a ply main portion extending from a tread portion through a side wall portion to a bead core of a bead section; and a ply turnup portion integral with the ply main portion and turned up from an axially inner side of the tire to an axially outer side thereof over the bead core;

a bead apex rubber with an approximately triangular cross section radially outwardly extending from the bead core between the ply main portion and the ply turnup portion; and a bead reinforcing cord layer of U-shaped cross section disposed on the bead section and comprising: a base portion disposed on a radially inner side of the bead core; an inner wound-up portion disposed along an axially inner surface of the ply main portion; and an outer wound-up portion disposed along an axially outer surface of the ply turnup portion and terminated at a radially inner side of an radially outermost end of the ply turnup portion, wherein:

the bead section is mounted on a 15°-tapered rim;

the bead core has a radially outer surface thereof inclined at an angle of 12 to 18° relative to an axial line of the tire, and has an approximately laterally long hexagonal cross section such that a core width Bw oriented in parallel to the radially outer surface of the bead core is larger than a core thickness Bt that is orthogonal to the radially outer surface;

the bead apex rubber comprises a lower apex portion of high-elastic rubber disposed on a radially inner side and an upper apex portion of rubber of lower elasticity than that of the rubber of the lower apex portion, the upper apex portion being disposed on a radially outer side;

the lower apex portion has an L-shaped cross section composed of a bottom piece portion disposed along the radially outer surface of the bead core and a standing piece portion standing from an axially inner end of the bottom piece portion and radially outwardly extending along the ply main portion, the standing piece portion having a thickness that gradually reduces in a radially outward direction;

the upper apex portion of the bead apex rubber has a thickness T1$s$ of 0.50 to 0.75 times the core width Bw at a position of a radially outer end of the ply turnup portion;

the upper apex portion has a thickness T2$s$ that is larger than the thickness T1$s$ and is 0.57 to 0.90 times the core width Bw at an intersection of a tire axial line X that passes on a radially outer end of the outer wound-up portion and the ply turnup portion;

the bead section has a Bw/BL ratio of 0.68 to 0.80, the Bw/BL ratio being a ratio between the core width Bw and an axial bead bottom width BL ranging from a bead heel point to a bead toe end; and the bead section has a W1/BL ratio of 0.92 to 1.08, the W1/BL ratio being a ratio between the bead bottom width BL and a distance W1 oriented in parallel to the radially outer surface of the bead core and ranging from the bead heel point to an axially innermost end of the bead core.

According to a second aspect of the present invention, the standing piece portion has a radial height H3 ranging from the bead heel point to a radially outer end of the standing piece portion, while the ply turnup portion has a radial height H2 ranging from the bead heel point to a radially outer end of the ply turnup portion, the radial height H3 being larger than the radial height H2.

According to a third aspect of the present invention, the bead core has a Bt/Bw ratio of 0.35 to 0.55, the Bt/Bw ratio being a ratio between the core thickness Bt and the core width Bw.

Unless noted otherwise, the dimensions of the parts of the tire in this specification are those specified in the normal state, where the tire is mounted on a normal rim and filled with a normal level of pressure without any load exerted thereto. The term "normal rim" refers to a rim specified on a tire basis by a standard upon which a tire is based, in a standard system including the standard. For example, the normal rim refers to the "standard rim" in JATMA, the "Design Rim" in TRA, and the "Measuring Rim" in ETRTO. The term "normal level of pressure" refers to a level of air pressure specified on a tire basis by a standard upon which a tire is based, in a standard system including the standard. For example, the normal level of pressure refers to the "maximum air pressure" in JATMA, the maximum value specified in "Tire Load Limits at Various Cold Inflation Pressures" in TRA, and the "Inflation Pressure" in ETRTO.

The term "bead heal point" refers to an axially outer end of the bead bottom that sits on the rim sheet, and serves as a reference point for determining the applied rim diameter. In this regard, an axial line that passes through the bead heal point will be referred to as a bead base line.

As described hereinbefore, the present invention employs an L-shaped cross section for the high-elastic lower apex portion of the bead apex rubber of two-layer structure. This reduces the rubber volume of the lower apex portion while increasing the rubber volume of the low-elastic upper apex portion. This in turn enhances alleviation effect for shearing strain acting on the outer end of the ply turnup portion.

Meanwhile, a sufficient restraining force of the bead core is secured by making the core width Bw of the bead core as high as 0.70 to 0.80 times the bead bottom width BL. Further, the bead core is moved toward the axially inner side to make the distance W1, which is oriented in parallel to the radially outer surface of the bead core and ranges from the bead heal point to the axially innermost end of the bead core, as high as 0.92 to 1.08 times the bead bottom width BL. That is, the bead core is relatively spaced apart from the rim flange, thereby effectively inhibiting the axially outward deformation of the bead with the rim flange serving as supporting point. Relatively spacing the bead core apart from the rim flange increases the degree of axially outward incline of the profile of the ply main portion before deformed, thus making the profile close to that during bead deformation. These advantageous effects are combined to effectively inhibit cord loosening at the outer end of the ply turnup portion, thereby improving bead durability.

DETAILED DESCRIPTION OF THE PREFERRED EMBODIMENT

The following detailed description is made with reference to the figures.

Figure 1:
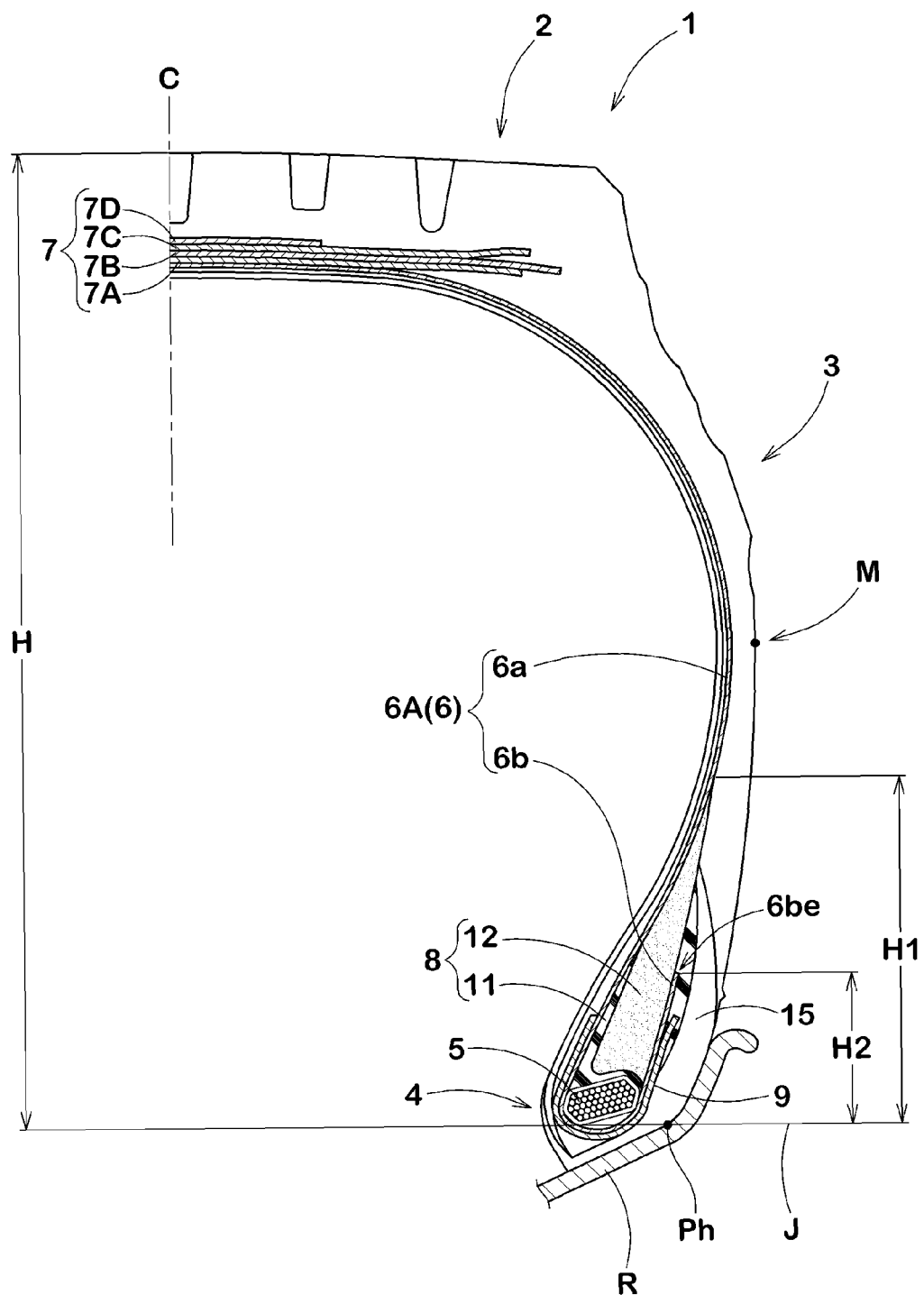
FIG. 1 is a cross sectional view of an embodiment of the heavy-load radial tire according to the present invention.

Referring to FIG. 1, a heavy-load radial tire 1 according to the present embodiment is a tubeless tire mounted on a 15°-tapered rim R and includes: a toroidal carcass 6 that extends from a tread portion 2 through a side wall portion 3 to a bead core 5 of a bead section 4; a belt layer 7 disposed in the tread portion 2 and on the radially outer side of the carcass 6; a bead apex rubber 8 that extends radially outwardly from the bead core 5 in a tapered manner; and a bead reinforcing cord layer 9 disposed on the bead section 4.

The carcass 6 is formed of a carcass ply 6A having steel carcass cords aligned at an angle of 80 to 90° relative to a tire equator C. The carcass ply 6A includes a ply main portion 6a extending between bead cores 5. Provided at each end of the ply main portion 6a is a ply turnup portion 6b integral with the ply main portion 6a and turned up from the axially inner side to the axially outer side over the bead core 5. There is no particular limitation to a radial height H2 (hereinafter occasionally referred to as turnup height H2 for convenience) that ranges from a bead base line J to a radial outer end 6be of the ply turnup portion 6b. Still, if the height H2 is excessively small, bending rigidity degrades, and the carcass ply is more likely to suffer what is called blow-by. If the height H2 is excessively large, riding comfortability significantly degrades, and durability cannot be enhanced because the outer end 6be approaches a tire maximum width position M where strain becomes maximum during driving of the vehicle. In view of these circumstances, the lower limit of the turnup height H2 is preferably 8% or more, more preferably 10% or more of a tire cross sectional height H, while the upper limit of the turnup height H2 is preferably 25% or less, more preferably 20% or less.

The belt layer 7 of the present embodiment is, for example, of the four-layer structure composed of an innermost belt ply 7A of steel belt cords aligned at an angle of approximately 60°±10° relative to the tire equator C, and belt plies 7B, 7C, and 7D aligned in this order on the radially outer side of the belt ply 7A at a small angle of approximately 15 to 35° relative to the tire equator C. The belt layer 7 secures at least one position where belt cords from different plies cross each other, thereby enhancing belt rigidity and firmly supporting approximately the entire width of the tread portion 2.

Figure 2:
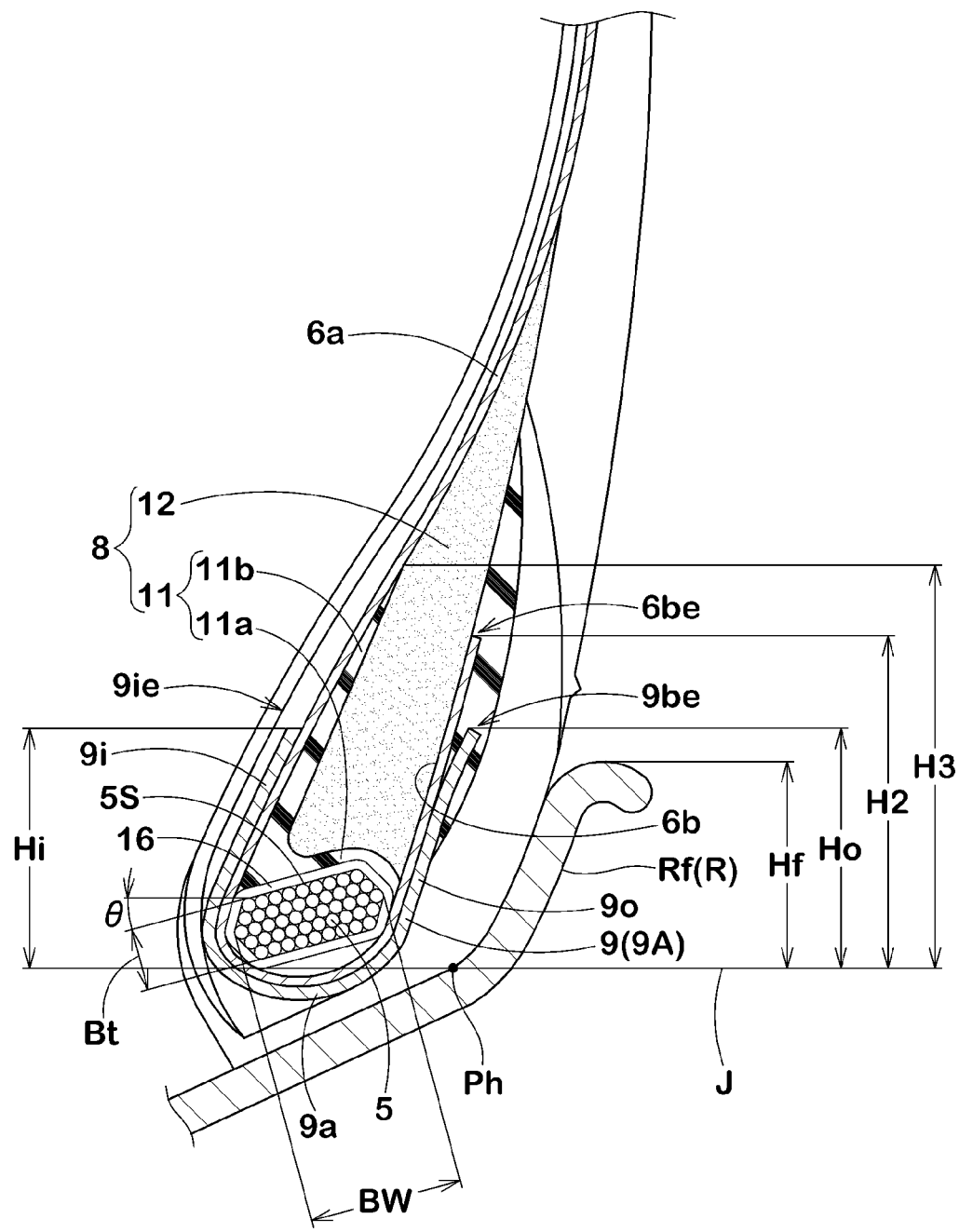
FIG. 2 is an enlarged cross sectional view of a bead section of the heavy-load radial tire.

Referring to FIG. 2, the bead core 5 has a laterally long hexagonal cross section such that a core width Bw oriented in parallel to a radially outer surface 5S of the bead core 5 is larger than a core thickness Bt that is orthogonal to the radially outer surface 5S. The radially outer surface 5S is inclined at 12 to 18° relative to the axial direction of the tire, thereby enhancing a wide range of engagement with the rim R. The bead core 5 is formed by winding a steel bead wire into a multicolumn/multistage arrangement and is surrounded by, in this embodiment, a wrapping layer 16 for preventing the bead wire from crumbling. As the wrapping layer 16, various layers may be conveniently used, examples including a rubber layer of rubber material alone and a canvas layer of rubber-coated canvas fabric.

The bead reinforcing cord layer 9 is formed of a bead reinforcing ply of steel reinforcing cords aligned at an angle of 30 to 60° relative to the circumferential direction of the tire. The bead reinforcing cord layer 9 has a U-shaped cross section composed of a base portion 9a disposed on the radially inner side of the bead core 5, an inner wound-up portion 9i disposed along the axially inner surface of the ply main portion 6a, and an outer wound-up portion 9o disposed along the axially outer surface of the ply turnup portion.

The bead reinforcing cord layer 9 reinforces the bead section 4. The inner and outer wound-up portions 9i and 9o respectively have radial heights Hi and Ho, which are based on the bead base line J. The radial heights Hi and Ho are larger than a height Hf of the rim flange and smaller than the turnup height H2. At heights equal to or smaller than the height Hf of the rim flange, the reinforcing effect is inadequate, while at heights equal to or larger than the turnup height H2, stress concentrates on radially outer ends 9ie and 9oe of the wound-up portions 9i and 9o, respectively, causing damage to occur on the radially outer ends 9ie and 9oe points. If the outer end 9oe of the outer wound-up portion 9o is too close to the outer end 6be of the ply turnup portion 6b, a rigidity difference results and stress concentrates on the outer end 6be. Thus, cord loosening at the outer end 6be might be unpreventable even in the present invention. In view of this, the height difference (H2−Ho) is preferably 5 mm or more, more preferably 7 mm or more, and still more preferably 8 mm or more.

The bead apex rubber 8 has an approximately triangular cross section radially outwardly extending from the bead core 5 between the ply main portion 6a and the ply turnup portion 6b. The bead apex rubber 8 includes a lower apex portion 11 of high-elastic rubber disposed on the radially inner side and an upper apex portion 12 of rubber of lower elasticity than that of the rubber of the lower apex portion 11, the upper apex portion 12 being disposed on the radially outer side of the lower apex portion 11.

The lower apex portion 11 has an approximately L-shaped cross section composed of a bottom piece portion 11a disposed along the radially outer surface of the bead core 5 and a standing piece portion 11b standing from the axially inner end of the bottom piece portion 11a and radially outwardly extending adjacent the ply main portion 6a, the standing piece portion 11b having a thickness that gradually reduces in the radially outward direction. The bottom piece portion 11a includes a portion of constant thickness t (see FIG. 3) extending along the outer surface of the bead core 5, and gradually reduces in thickness toward the axially outer side to terminate between the axially outer surface of the bead core 5 and the ply turnup portion 6b. The constant thickness t is preferably approximately 0.5 to 3.0 mm, for example. The standing piece portion 11b has a radial height H3 (hereinafter occasionally referred to as standing piece height H3 for convenience) ranging from the bead base line J to a radially outer end 11be of the standing piece portion 11b. The radial height H3 is larger than the ply turnup height H2. If the difference (H3−H2) is too small, a rigidity difference occurs in the bead section 4 and stress concentrates on the outer end 6be of the ply turnup portion 6b. In view of this, the height difference (H3−H2) is preferably 5 mm or more, more preferably 7 mm or more, and still more preferably 8 mm or more.

Since the standing piece portion 11b of the high-elastic lower apex portion 11 radially outwardly extends adjacent the ply main portion 6a, the bead apex rubber 8 cooperates with the carcass cords to enhance the bending rigidity of the bead section 4. In addition, securing that the standing piece height H3 is larger than the turnup height H2 alleviates the concentration of strain on the outer end 6be of the ply turnup portion 6b to some degree. The standing piece portion 11b gradually reduces its thickness toward the radially outward direction, thereby inhibiting the concentration of strain on the outer end 11be. The L-shaped cross section of the lower apex portion 11 increases the ratio of the thickness of the low-elastic upper apex portion 12 to the entire thickness of the bead apex rubber 8. This enables the upper apex portion 12 to deform flexibly against compressive strain on the ply turnup portion 6b associated with bead deformation, thereby alleviating and absorbing shearing stress acting on the carcass cords.

Figure 3:
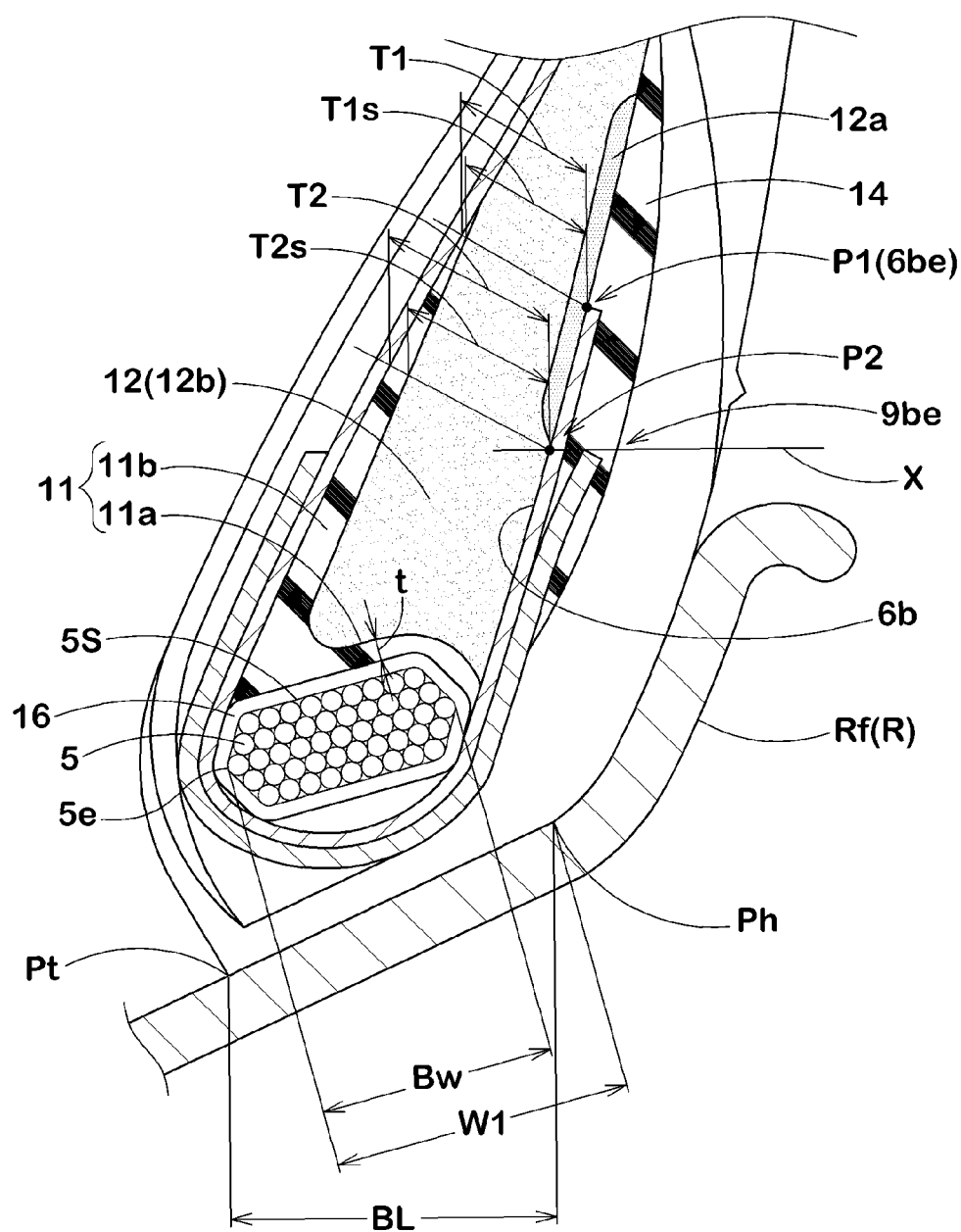
FIG. 3 is a further enlarged cross sectional view of the bead section shown in FIG. 2.

This requires that referring to FIG. 3, a thickness T1s of the upper apex portion 12 at a position P1 of the outer end 6be of the ply turnup portion 6b be 0.50 to 0.75 times the core width Bw. It is also required that the thickness T2s of the upper apex portion 12 at an intersection P2 of a tire axial line X that passes on the outer end 9oe of the outer wound-up portion 9o and the ply turnup portion 6b be 0.57 to 0.90 times the core width Bw and larger than the thickness T1s.

If the thickness T1s is less than 0.50 times the core width Bw and the thickness T2s is less than 0.57 times the core width Bw, the alleviation and absorption effect for shearing strain by the upper apex portion 12 is inadequate. If the thickness T1s is more than 0.75 times the core width Bw and the thickness T2s is more than 0.90 times the core width Bw, the entire thickness of the bead apex rubber 8 becomes excessive, which may hinder reduction in weight and material cost. In view of this, the lower limit of the thickness T1s is preferably equal to or more than 0.52 times, and more preferably equal to or more than 0.53 times the core width Bw, and the upper limit of the thickness T1s is preferably equal to or less than 0.58 times, and more preferably equal to or less than 0.57 times the core width Bw. The lower limit of the thickness T2s is preferably equal to or more than 0.58 times, and more preferably equal to or more than 0.60 times the core width Bw, and the upper limit of the thickness T2s is preferably equal to or less than 0.67 times, and more preferably equal to or less than 0.65 times the core width Bw. The thicknesses T1s and T2s are measured on perpendicular lines drawn from the respective positions P1 and P2 to the ply main portion 6a.

The ratio T1s/T1 of the thickness T1s to the entire thickness T1 of the bead apex rubber 8 at the position P1, and the ratio T2s/T2 of the thickness T2s to the entire thickness T2 of the bead apex rubber 8 at the position P2 are preferably in the range of 0.75 to 0.95. If the ratios T1s/T1 and T2s/T2 are less than 0.75, the alleviation and absorption effect for shearing strain by the upper apex portion 12 degrades, while in excess of 0.95, the bead deformation tends to develop, thereby causing the shearing strain to develop. Thus, falling below 0.75 and exceeding 0.95 are both not preferred.

In this regard, the lower apex portion 11 preferably has a complex modulus E*1 of elasticity in the range of 30.0 to 90.0 MPa, and the upper apex portion 12 preferably has a complex modulus E*2 of elasticity in the range of 2.0 to 15.0 MPa. If the complex modulus E*1 of elasticity of the lower apex portion 11 is less than 30.0 MPa, the bead deformation develops to cause the shearing strain to develop, while exceeding 90.0 MPa results in a tendency of hindering the alleviation and absorption effect for shearing strain by the upper apex portion 12. If the complex modulus E*2 of elasticity of the upper apex portion 12 is less than 2.0 MPa, the bead rigidity is inadequate, thereby causing the shearing strain to develop, while in excess of 15.0 MPa, the alleviation and absorption effect for shearing strain tends to degrade. In view of these circumstances, the complex modulus E*1 of elasticity is preferably 50.0 MPa or more at the lowest and 80.0 MPa or less at the highest, and the complex modulus E*2 of elasticity is preferably 3.0 MPa or more at the lowest and 10.0 MPa or less at the highest.

If the difference (E*1−E*2) between the complex modulus E*1 of elasticity of the lower apex portion 11 and the complex modulus E*2 of elasticity of the upper apex portion 12 is too large, strain tends to concentrate on the interface between the rubber portions, while if the difference is too small, the inhibition effect for bending of the bead section 4 and the alleviation and absorption effect for shearing strain might not be sufficient. In view of these circumstances, the difference ($E*1-E*2$) between the complex moduli of elasticity is preferably 40.0 MPa or more at the lowest, more preferably 50.0 MPa, and 85.0 MPa or less at the highest, more preferably 80.0 MPa or less.

The complex modulus $E*$ of elasticity is based on JIS-K6394 and measured with a viscoelasticity spectrometer available from Iwamoto Quartz Glass Lab Co., Ltd. at an initial strain of 10%, an amplitude of ±1.0%, a frequency of 10 Hz, and 70° C.

Further, the present invention enhances the inhibition effect for cord loosening at the ply turnup portion 6*b* by moving the bead core 5 toward the axially inner side to increase the distance between a bead heal point Ph and an axially innermost end 5*e* of the bead core 5 while securing a sufficient core width Bw of the bead core 5.

Specifically, first, the core width Bw is 0.68 to 0.80 times the bead bottom width BL, which is an axial distance between the bead heal point Ph and the bead toe end Pt. That is, the Bw/BL ratio is 0.68 to 0.80. Securing a sufficient core width Bw in this manner enhances the restraining force of the bead core 5.

Then, the distance W1, which is along the radially outer surface 5S of the bead core 5 and ranges from the bead heal point Ph to the axially innermost end 5*e* of the bead core 5, is 0.92 to 1.08 times the bead bottom width BL. That is, the W1/BL ratio is 0.92 to 1.08.

This causes the bead core 5 to be relatively spaced apart from the rim flange Rf, thereby effectively inhibiting the axially outward deformation of the bead with the rim flange Rf serving as supporting point, that is, such a bead deformation that the bead cord 5 radially outwardly floats with the rim flange Rf serving as supporting point. This requires the bead core 5 to have a sufficient restraining force, and therefore the core width Bw is restricted within the above-described range. Further, relatively spacing the bead core 5 apart from the rim flange Rf increases the degree of axially outward incline of the profile of the ply main portion 6*a* before deformed. That is, the profile of the ply main portion 6*a* comes close to that during bead deformation, thereby relatively reducing the degree of strain. These advantageous effects combine with each other to inhibit the bead deformation itself and thus reduce shearing strain. In addition, these combined advantageous effects further combine with the absorption and alleviation of shearing strain by the bead apex rubber 8 to enhance the inhibition effect for cord loosening at the ply turnup portion 6*b*, thereby further improving bead durability.

If the Bw/BL ratio is less than 0.68, the restraining force of the bead core 5 is inadequate, failing to realize sufficient inhibition of the bead deformation by spacing the bead core 5 apart from the rim flange Rf. In excess of 0.80, where the core width Bw is large relative to the bead bottom width BL, the contact pressure of the carcass cords and the bead wire in the vicinity of the axially innermost end 5*e* increases during driving with load, resulting in a tendency of causing cord damage due to fretting. In view of these circumstances, the Bw/BL ratio is preferably 0.70 or more, further preferably 0.72 or more at the lowest and 0.78 or less at the highest.

If the W1/BL ratio is less than 0.92, the inhibition effect for the bead deformation realized by spacing the bead core 5 apart from the rim flange Rf is inadequate, while in excess of 1.08, the formation of the tire becomes difficult. In view of these circumstances, the W1/BL ratio is preferably 0.94 or more at the lowest and 1.05 or less at the highest.

For weight reduction, the bead core 5 preferably has a 0.35 to 0.55 Bt/Bw ratio, between the core thickness Bt and the core width Bw. If the Bt/Bw ratio exceeds 0.55, weight reduction is inadequate, while below 0.35, the bead core 5 becomes excessively flattened and thus lacks strength, thereby raising a possibility of disarrangement of the bead wire (core crumbling).

Referring to FIG. 3, the upper apex portion 12 includes an edge cover rubber portion 12*a* adjacent the outer end portion of the ply turnup portion 6*b*. The edge cover rubber portion 12*a* extends radially inwardly and outwardly at a small thickness of 0.5 to 2 0 mm with the outer end 6*be* of the ply turnup portion 6*b* as center of extension. The complex modulus of elasticity of the edge cover rubber portion 12*a* is within the range of the complex modulus $E*2$ of elasticity (2.0 to 15.0 MPa), but may be smaller than the complex modulus of elasticity of a main portion 12*b* (the portion of the upper apex portion 12 excluding the edge cover rubber portion 12*a*) of the upper apex portion 12, in which case cord loosening can be inhibited more effectively.

In the present embodiment, an insulation rubber 14 is disposed between the ply turnup portion 6*b* and the outer wound-up portion 9*o* of the bead reinforcing cord layer 9. This gradually increases the cord distance between the ply turnup portion 6*b* and the outer wound-up portion 9*o* toward the radially outward direction. This prevents cord damage due to fretting between the ply turnup portion 6*b* and the outer wound-up portion 9*o*.

While the preferred embodiment of the present invention has been described in detail, it should not be construed in a limiting sense, and various modifications may be made.

Figure 4A:
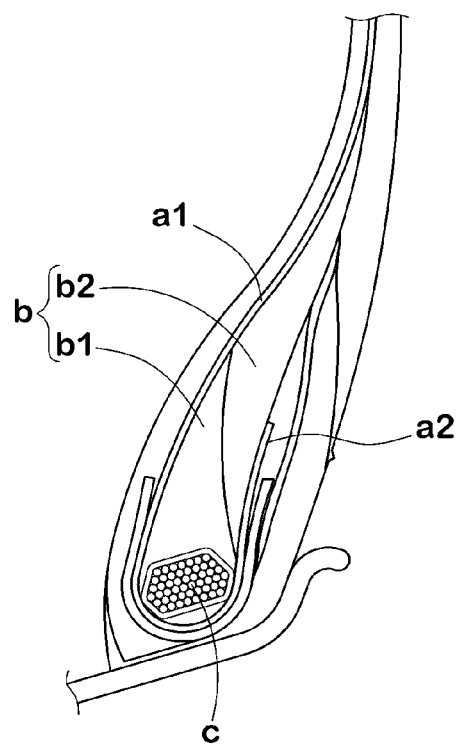
FIGS. 4A and 4B are cross sectional views of conventional bead structures.
Figure 4B:
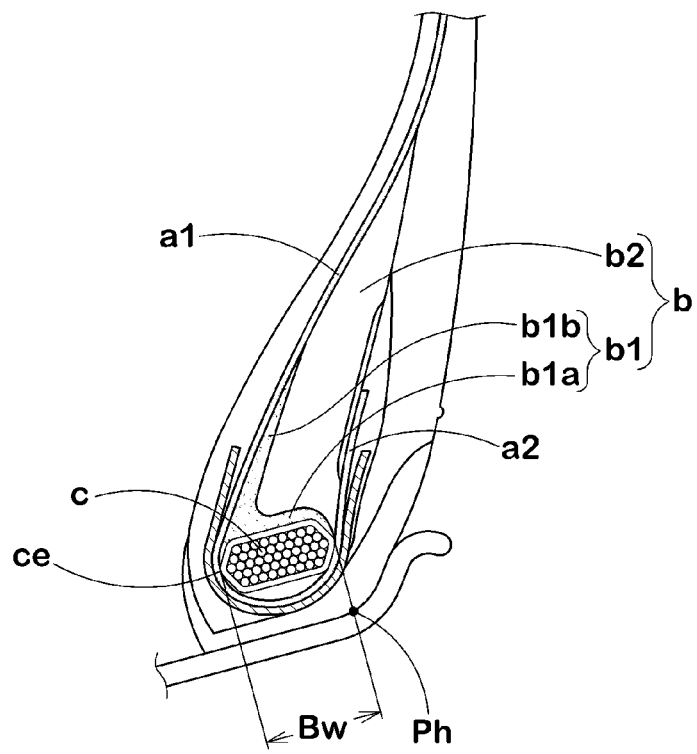

Heavy-load radial tires having the bead structure shown in FIG. 2 were prepared for trial in accordance with specifications listed in Table 1 and compared with each other in terms of bead durability. Comparative example 1 has the bead structure shown in FIG. 4A. Parameters not listed in Table 1 are substantially common among the examples. Here are common, major conditions.

Tire size: 11R22.5,
Tire cross section height: 239.8 mm,
Rim size: 22.5×7.50,
Rim flange height Hf: 12.7 mm,
Internal pressure: 800 kPa,
Carcass:
    Number of plies: 1
    Cord material: steel
    Cord arrangement angle: 88° (relative to tire equator),
Belt layer:
    Number of plies: 4
    Cord material: steel
    Cord arrangement angle: 50° at right/18° at right/18° at left/18° at left (relative to tire equator). The order is from the inner ply to the outer ply, with "right" denoting rightward incline and "left" denoting leftward incline.
Bead reinforcing cord layer (U-shaped):
    Number of plies: 1
    Cord material: steel
    Cord arrangement angle: 25° (relative to tire equator),
Height H1 of bead apex rubber: 80 mm,
Height H2 of ply turnup portion of carcass: 37 mm,
Height Ho of outer wound-up portion of bead reinforcing cord layer: 27 mm,
Height Hi of inner piece portion of bead reinforcing cord layer: 27 mm,
Complex modulus $E*1$ of elasticity of lower apex portion: 75.0 MPa,
Complex modulus $E*2$ of elasticity of upper apex portion: 5.0 MPa.

In each of Comparative examples and Examples, 1000 tires were made, and the numbers of incidence of faulty tires were compared with one another.

<Bead Durability>

Each tire was subjected to running on a drum at a speed of 20 km/h under a vertical load condition of 47.4 kN (twice the standard load) in order to measure a running period of time before occurrence of damage to the bead section. The estimation was represented in the form of an index with the running period of time of comparative example 1 assumed 100. A larger value indicates a superior bead durability.

TABLE 1

|  | Comp. Ex 1 | Ex 1 | Ex 2 | Ex 3 | Ex 4 | Ex 5 | Ex 6 | Comp. Ex 2 | Comp. Ex 3 | Comp. Ex 4 | Comp. Ex 5 |
|---|---|---|---|---|---|---|---|---|---|---|---|
| Bead structure | FIG. 4A | FIG. 2 | FIG. 2 | FIG. 2 | FIG. 2 | FIG. 2 | FIG. 2 | FIG. 2 | FIG. 2 | FIG. 2 | FIG. 2 |
| Cross section of lower apex portion | Triangle | L | L | L | L | L | L | L | L | L | L |
| Bead core |  |  |  |  |  |  |  |  |  |  |  |
| Core width Bw (mm) | 16.5 | 18.0 | 18.0 | 18.0 | 18.0 | 19.5 | 20.8 | 18.0 | 18.0 | 16.9 | 22.1 |
| Core thickness Bt (mm) | 9.6 | 8.2 | 8.2 | 8.2 | 8.2 | 8.2 | 8.2 | 8.2 | 8.2 | 8.2 | 8.2 |
| Angle θ (degrees) | 15 | 15 | 15 | 15 | 15 | 15 | 15 | 15 | 15 | 15 | 15 |
| Entire thickness of bead apex rubber |  |  |  |  |  |  |  |  |  |  |  |
| T1 (mm) | 13 | 12 | 12 | 12 | 12 | 12 | 12 | 12 | 12 | 12 | 12 |
| T2 (mm) | 15 | 14 | 14 | 14 | 14 | 14 | 14 | 14 | 14 | 14 | 14 |
| Thickness ratio of upper apex portion |  |  |  |  |  |  |  |  |  |  |  |
| T1s/Bw ratio | 0.67 | 0.61 | 0.61 | 0.61 | 0.61 | 0.56 | 0.53 | 0.61 | 0.61 | 0.65 | 0.50 |
| T2s/Bw ratio | 0.73 | 0.67 | 0.67 | 0.67 | 0.67 | 0.62 | 0.58 | 0.67 | 0.67 | 0.71 | 0.54 |
| Bw/BL ratio | 0.63 | 0.69 | 0.69 | 0.69 | 0.70 | 0.75 | 0.80 | 0.69 | 0.69 | 0.65 | 0.85 |
| W1/BL ratio | 0.84 | 0.92 | 0.96 | 1.08 | 0.96 | 0.96 | 0.96 | 0.85 | 1.10 | 0.96 | 0.96 |
| Bead durability (index) | 100 | 120 | 125 | 128 | 120 | 115 | 120 | 110 | 110 | 110 | 105 |
| Number of incidence of faulty tires | 0 | 0 | 0 | 0 | 0 | 0 | 0 | 0 | 5 | 0 | 0 |

The results of the test proved that the tires of the inventive examples had improved bead durability. As shown in Comparative example 3, the too large W1/BL ratio makes it more difficult to form tires and easier to increase the number of incidence of faulty tires.

What is claimed is:

1. A heavy-load radial tire comprising:

a carcass comprising a carcass ply, the carcass ply comprising: a ply main portion extending from a tread portion through a side wall portion to a bead core of a bead section; and a ply turnup portion integral with the ply main portion and turned up from an axially inner side of the tire to an axially outer side thereof over the bead core;

a bead apex rubber with an approximately triangular cross section radially outwardly extending from the bead core between the ply main portion and the ply turnup portion; and a bead reinforcing cord layer of U-shaped cross section disposed on the bead section and comprising: a base portion disposed on a radially inner side of the bead core; an inner wound-up portion disposed along an axially inner surface of the ply main portion; and an outer wound-up portion disposed along an axially outer surface of the ply turnup portion and terminated at a radially inner side of an radially outermost end of the ply turnup portion, wherein:

the bead section is mounted on a 15°-tapered rim;

the bead core has a radially outer surface thereof inclined at an angle of 12 to 18° relative to an axial line of the tire, and has an approximately laterally long hexagonal cross section such that a core width Bw oriented in parallel to the radially outer surface of the bead core is larger than a core thickness Bt that is orthogonal to the radially outer surface;

the bead apex rubber comprises a lower apex portion of high-elastic rubber disposed on a radially inner side and an upper apex portion of rubber of lower elasticity than that of the rubber of the lower apex portion, the upper apex portion being disposed on a radially outer side;

the lower apex portion has an L-shaped cross section composed of a bottom piece portion disposed along the radially outer surface of the bead core and a standing piece portion standing from an axially inner end of the bottom piece portion and radially outwardly extending along the ply main portion, the standing piece portion having a thickness that gradually reduces in a radially outward direction;

the upper apex portion of the bead apex rubber has a thickness T1s of 0.50 to 0.75 times the core width Bw at a position of a radially outer end of the ply turnup portion;

the upper apex portion has a thickness T2s that is larger than the thickness T1s and is 0.57 to 0.90 times the core width Bw at an intersection of a tire axial line X that passes on a radially outer end of the outer wound-up portion and the ply turnup portion;

the bead section has a Bw/BL ratio of 0.68 to 0.80, the Bw/BL ratio being a ratio between the core width Bw and an axial bead bottom width BL ranging from a bead heal point to a bead toe end; and the bead section has a W1/BL ratio of 0.92 to 1.08, the W1/BL ratio being a ratio between the bead bottom width BL and a distance W1 oriented in parallel to the radially outer surface of the bead core and ranging from the bead heal point to an axially innermost end of the bead core.

2. The heavy-load radial tire according to claim 1, wherein the standing piece portion has a radial height H3 ranging from the bead heal point to a radially outer end of the standing piece portion, while the ply turnup portion has a radial height H2 ranging from the bead heal point to a radially outer end of the ply turnup portion, the radial height H3 being larger than the radial height H2.

3. The heavy-load radial tire according to claim 1, wherein the bead core has a Bt/Bw ratio of 0.35 to 0.55, the Bt/Bw ratio being a ratio between the core thickness Bt and the core width Bw.

4. The heavy-load radial tire according to claim 1, wherein the bottom piece portion includes a portion of constant thickness t extending along an outer surface of the bead core, the thickness being 0.5 to 3.0 mm.

* * * * *